United States Patent [19]

Okuno

[11] Patent Number: 4,771,304
[45] Date of Patent: Sep. 13, 1988

[54] FOCUSING SCREEN

[75] Inventor: Youichi Okuno, Kanagawa, Japan

[73] Assignee: Canon Kabushiki Kaisha, Tokyo, Japan

[21] Appl. No.: 441,937

[22] Filed: Nov. 15, 1982

Related U.S. Application Data

[63] Continuation of Ser. No. 125,788, Feb. 29, 1980, abandoned.

[30] Foreign Application Priority Data

Mar. 5, 1979 [JP] Japan .................................. 54-25392
Mar. 15, 1979 [JP] Japan .................................. 54-25393

[51] Int. Cl.$^4$ ............................................... G03B 3/00
[52] U.S. Cl. .................................................. 354/200
[58] Field of Search ............... 354/155, 199, 200, 201, 354/224, 225, 219 IF; 350/286

[56] References Cited

U.S. PATENT DOCUMENTS 2,569,516 10/1951 Corsi et al. ..................... 354/200 X
2,881,686 4/1959 Rühle ............................. 354/155 X
4,003,637 1/1977 Masuoka ........................... 350/286

FOREIGN PATENT DOCUMENTS 713929 8/1931 France .................................. 354/200
1107591 8/1955 France .................................. 354/200
681928 10/1952 United Kingdom ................ 354/200

Primary Examiner—Donald A. Griffin
Attorney, Agent, or Firm—Toren, McGeady & Associates

[57] ABSTRACT

A focusing screen provided with a plurality of cylindrical lenses adjacent to one another is disclosed. The adjacent two of the cylindrical lenses have individual characteristics to shift between respective areas an image of an object in opposite directions when the object is out of focus. For this reason, when in an out-of-focus condition, the amount of the slided image along a boundary line between the areas is doubled, thus permitting the operator to perform a focusing operation with high accuracy.

11 Claims, 4 Drawing Sheets

FOCUSING SCREEN

This is a continuation of application Ser. No. 125,788, filed Feb. 29, 1980, now abandoned.

BACKGROUND OF THE INVENTION

1. Field of the Invention:

This invention relates to distance meter built-in focusing screens for optical instruments, and, more particularly, to improvements of focusing screens of the so-called Dūo Focus type where on the focusing screen there is provided a cylindrical lens as the distance meter the ability of that cylindrical lens to increase and decrease the size of image in one direction in out-of-focus condition is utilized in measuring the object distance (focusing, distance coincidence).

2. Description of the Prior Art:

The distance measuring principles of a cylindrical lens are first explained below by reference to FIGS. 1 and 2.

In FIG. 1, an optical instrument is equipped with an image forming objective lens 1 in front of a focal plane in which a focusing screen 2 lies. The focusing screen 2 is provided with a distance meter in the form of a cylindrical lens 3 at the center of the area thereof with its mother line in parallel with the surface of the focusing screen. In order measure the distance, the objective lens 1 is axially moved while the area of the cylindrical lens 3 is observed from the rear of the focusing screen 2 by an eye 4 of the operator.

In FIG. 2, letting 0-0 denote the optical axis of the cylindrical lens 3, r the radius of curvature of the cylindrical lens with the center at a point A, and f the focal length of the cylindrical lens 3, the focal length f for the thin lens system may be expressed as follows:

$$f = r/(n-1)$$

where n is the index of refraction of a material of which the cylindrical lens 3 is made up.

Now assuming that a ray of light L from the objective lens 1 (FIG. 1) enters the cylindrical lens 3 and arrives at a point B on the rear or convex surface thereof, the distance of the point B from the optical axis 0-0 being h, then the ray L exits from the surface in deflection by an angle, meeting the optical axis 0-0 at the point C which is the focal point of the cylindrical lens. This deflection angle may be defined by $\delta = h/f$, thus being proportional to the height h of incidence of that ray.

With the principal plane of the cylindrical lens 3 coinciding with the focusing screen surface, when the objective lens 1 takes a focusing position where a sharp image is formed at a plane deviated from the screen surface either rearwardly or forwardly by a distance, dx, (the object is out of focus), the image viewed through the cylindrical lens 3 appears to be shifted in a direction perpendicular to the optical axis 0-0 by an amount, dh. This amount of shift, dh, is:

$$dh = \delta dx = (h/f)dx$$

thus being proportional to the distance h of the image point from the optical axis and the defocusing amount, dx, and inversely proportional to the focal length of the cylindrical lens 3.

That is, in the rear defocusing position, the point B appears to lie at a point D so that a subject of length, h, is observed as reduced to a length, $h_1$. Conversely in the front defocusing position, the point B appears to lie at a point E so that the length, h, is observed as enlarged to a length, $h_2$. In conclusion, the cylindrical lens 3 has a function of shortening or enlarging the off-axis amount, h, of the out-of-focus image. This function is valid only for the direction perpendicular to the cylindrical axis of the lens 3, and has no effect in the axial direction.

With such cylindrical lens 3 provided on the focusing screen 2 at the center of the area thereof, disposed with its mother line in parallel to the focusing surface of the screen, and oriented so that the mother line makes an angle of, for example, 45° with the horizontal line as shown in FIG. 3, therefore, when focusing of the objective lens 1 is performed, while the field of view of the focusing screen 2 is observed, an image 5 of an object of which the distance is to be measured (for convenience, the object is assumed to be a vertical line) formed by the objective lens 1 appears upon detection of an in-focus condition to be a single continuous line, since an image section $5_2$ in the cylindrical lens 3 coincides with upper and lower image sections $5_1$ and $5_3$, as shown in FIG. 3(b). Unless the objective lens is focused on the object, the observer will recognize a shifted image with the image section $5_2$ in the cylindrical lens area to be inclined with respect to the upper and lower image sections $5_1$ and $5_3$ as shown in FIG. 3(a) and FIG. 3(c) for front and rear defocusing positions respectively. Thus, this type distance meter is characterized in that when the object is out of focus, the image section $5_2$ seen in the cylindrical lens 3 appears as turned by an angle proportional to the increase or decrease of the above identified off-axis distance, h.

It is noted that instead of the cylindrical lens of the convex type, a concave one may be used to effect the above described phenomenon except that the direction of deformation of the image to the shortening and enlarging with defocusing is reversed to that when it is of the convex type.

To achieve distance measurement, therefore, the operator is required to adjust the position of a focusing actuator of the optical instrument until the three image sections merge into one. The foregoing is the outline of the distance measuring principles.

In putting the principles into practice, the focusing screen is constructed by the use of one or more cylindrical lens or lenses on the focal plane of the screen plate. In the latter connection, it is known (A) to arrange the cylindrical lenses in spaced relation to each other, and (B) to arrange the cylindrical lenses in adjacent parallel relation to each other with their adjoining lines being collimated to the mother lines of the cylindrical lenses.

The focusing screen of the type (A), because of its individual cylindrical lenses admitting mere comparison of the image sections seen by the cylindrical lenses with those seen in the surrounding areas of the focusing screen, has a disadvantage of providing as low a distance measurement accuracy as when only one cylindrical lens is used. The focusing screen of the type (B), though being superior in distance measurement accuracy to that of the type (A), has a drawback that when the optical instrument is associated with an objective lens of dark F-number, a black veil is formed around the boundary of each pair of cylindrical lenses. This makes it difficult to perform distance measurement while seeing the object at the veiled area thereof. This leads to decrease of the distance measurement accuracy.

SUMMARY OF THE INVENTION

It is, therefore, an object of the present invention to provide an improved focusing screen.

To achieve this object, according to the present invention, the characteristics of the adjacent two of the cylindrical lenses are differentiated from each other.

DESCRIPTION OF THE PREFERRED EMBODIMENTS

Figure 4:
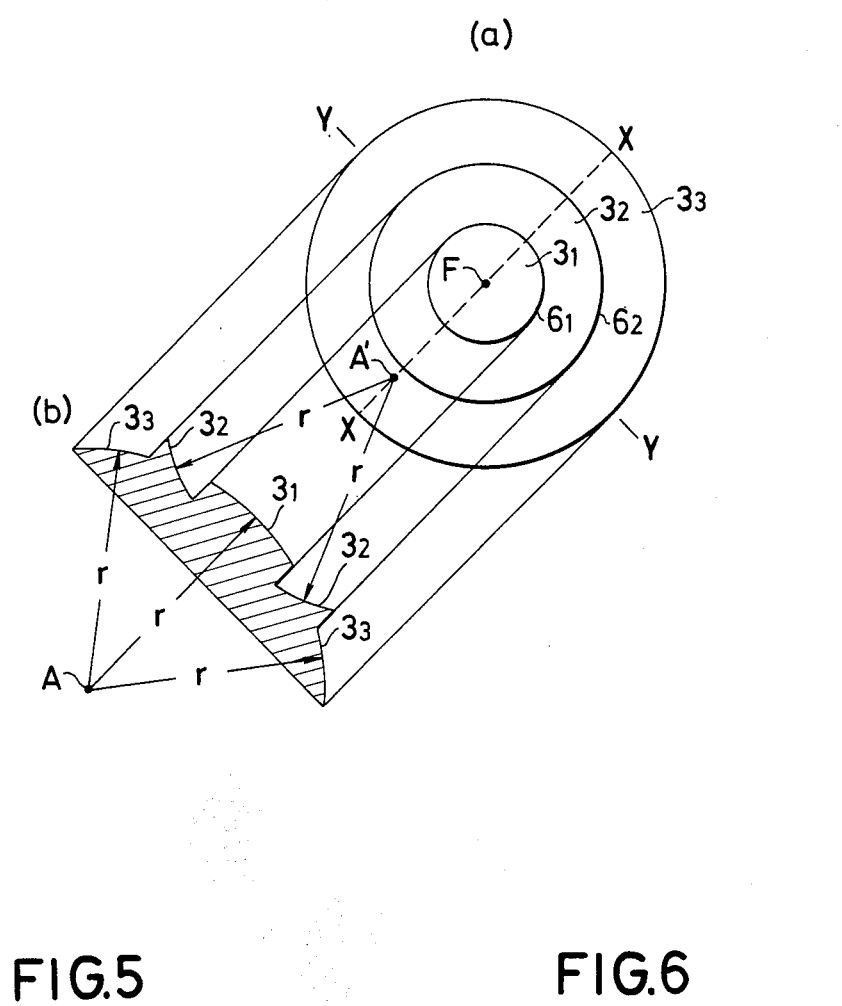
FIG. 4 shows one embodiment of the present invention with FIG. 4(a) being a plan view and FIG. 4(b) being a sectional view taken along Y—Y line of FIG. 4(a).

FIG. 4 shows a first embodiment of the present invention where use is made of three cylindrical lenses of convex, concave and convex types $3_1$, $3_2$ and $3_3$ respectively arranged adjacent to each other with their adjoining surfaces $6_1$ and $6_2$ being concentric to each other. The radii of curvature of all the cylindrical lenses are equal to each other, and their mother lines X—X are parallel to each other and are inclined by angles of 45° with respect to the outer periphery of the focusing screen. The assembly of the cylindrical lenses $3_1$, $3_2$ and $3_3$ are formed on the focal plane of the focusing screen. FIG. 4(b) is a sectional view of the assembly taken along Y—Y line of FIG. 4(a) (perpendicular to the mother line X—X).

Figure 1:
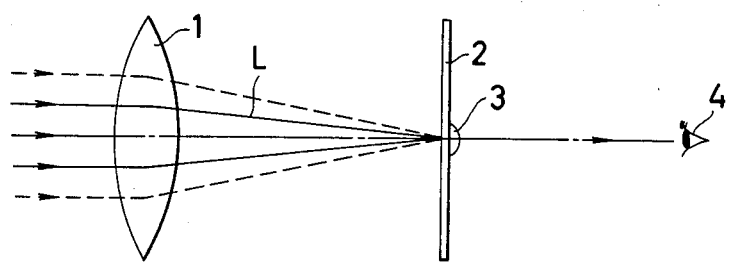
FIGS. 1 and 2 show the principles of distance measurement of a distance meter utilizing a cylindrical lens.
Figure 2:
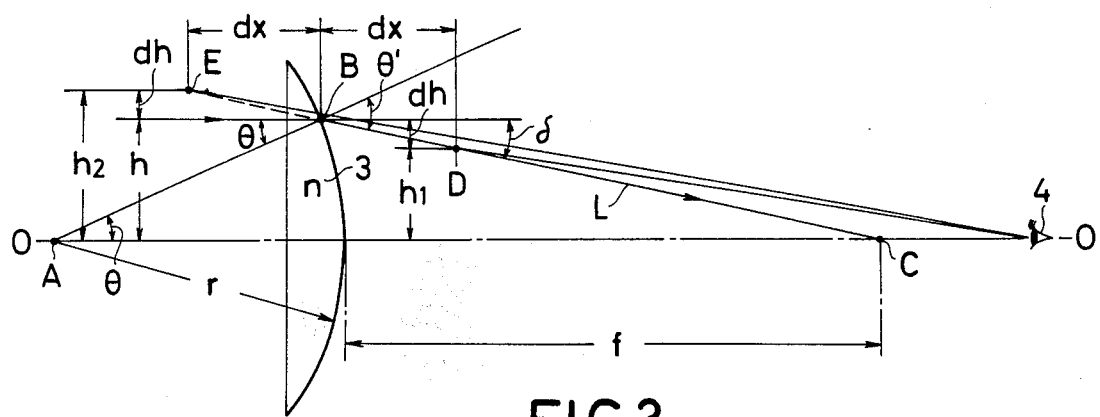
Figure 3:
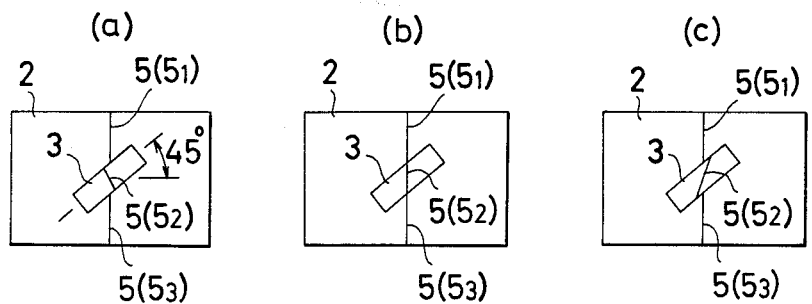
FIG. 3 shows plan views of how the field of view of the focusing screen is seen with FIG. 3(a) in a front defocusing position, FIG. 3(b) in focus position, and FIG. 3(c) in a rear defocusing position.
Figure 5:
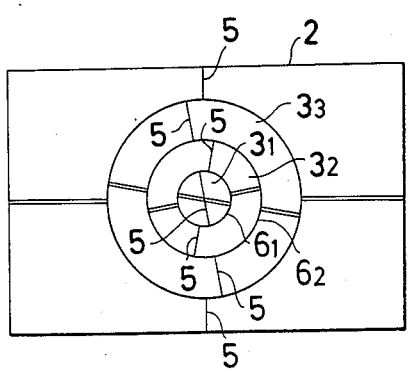
FIG. 5 is a plan view of the field of view of the focusing screen when the distance meter of FIG. 4 is out of focus.
Figure 6:
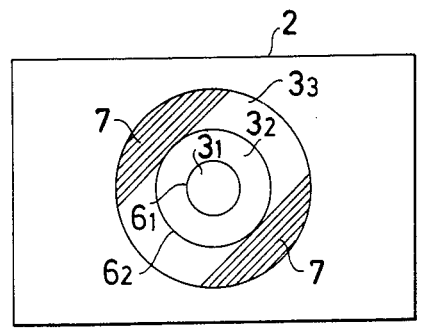
FIG. 6 is a similar view showing formation of black veils in the cylindrical lenses of FIG. 4.

FIG. 5 shows a finder image 5 of a vertical line object when it is out of focus. Since the individual cylindrical lenses $3_1$, $3_2$ and $3_3$ enlarge and shorten the image 5 in opposite directions to each other toward angles of 45°, the resultant image sections appear as turned in opposite directions to each other. That is, a vertical continuous line image 5 to be seen when that subject is in focus is shifted to the left and right to the inside and outside of each of the concentric circular boundaries of the all lenses $3_1$, $3_2$ and $3_3$, as in the split-image type distance meter. In comparison with the conventional distance meter using only one cylindrical lens shown in FIG. 3, therefore, the accuracy of distance measurement can be doubled. Further since the present invention employs the arrangement of three kinds of cylindrical lenses $3_1$, $3_2$ and $3_3$, images of an object separated by their two boundaries $6_1$ and $6_2$ play respective different roles to each other to connected with same boundary for the accuracy of distance measurement. When an objective lens of light F-number is attached to the optical instrument, a slide of image at the boundary $6_2$ may be used in performing the distance measurement. With a dark F-number, on the other hand, the inner boundary $6_1$ can be utilized while permitting black veils 7 to be formed simultaneously, thus assuring a high accuracy of distance measurement at all times.

As has been mentioned above, according to this embodiment, with the focusing screen utilizing the cylindrical lens as the distance meter, it is possible not only to quickly and easily measure the distance with high accuracy whatever F-number the objective lens has, but also to aim at any object as the distance measuring target, independently of whether it is a vertical, or a horizontal line, as any one of these subjects provides a shifted sharp image. Thus, the present invention is very advantageous and suited to improve this type of focusing screen.

It is noted that the adjacent two of the cylindrical convex and concave lenses, though shown in the drawings to confront at the concentric circular boundary $6_1$ and $6_2$ may be modified to provide a linear boundary.

Figure 7:
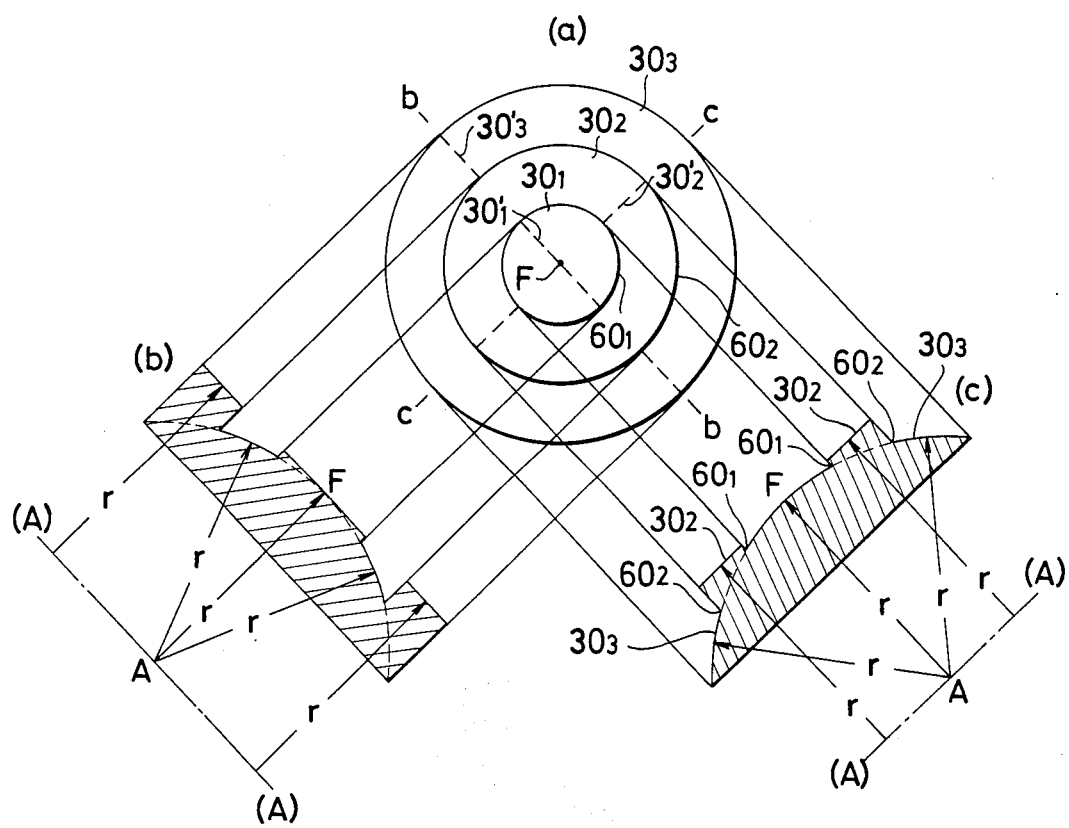
FIG. 7 shows a second embodiment of the present invention with FIG. 7(a) being a plan view and with FIGS. 7(b) and 7(c) being sectional views taken along b—b and c—c lines of FIG. 7(a).

FIG. 7 shows a second embodiment of the present invention where the distance meter is constructed in the form of three cylindrical lenses $30_1$, $30_2$ and $30_3$ of which the radii of curvature are made equal to each other, arranged adjacent to each other with their confronting boundaries $60_1$ and $60_2$ being concentric to each other and oriented so that the directions of mother lines $30'_1$, $30'_2$ and $30'_3$ of the individual cylindrical lenses $30_1$, $30_2$ and $30_3$ make angles of 90° with each other. Such distance meter is placed on the focal plane of a focusing screen at the center of the area thereof and disposed with their mother lines making angles of 45° with respect to the horizontal line. FIGS. 7(b) and 7(c) are sectional views taken along b—b line and c—c line.

Figure 8:
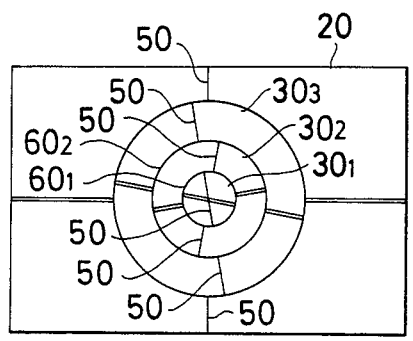
FIG. 8 is a plan view of the focusing screen using the distance meter of FIG. 7 when in out-of-focus position.

FIG. 8 shows how the focusing screen of FIG. 7 is seen. As an image 50 in the field of view is enlarged and shortened by the individual cylindrical lenses in different directions to each other toward the directions of 45°, the various image sections appear to be turned in opposite directions to each other. That is, an image of a vertical continuous line object seen there when out of focus is shifted to the left and right in the inside and outside of each of the concentric circular boundaries $60_1$ and $60_2$ of the all cylindrical lenses $30_1$, $30_2$ and $30_3$ as in the split-image type distance meter. Therefore, the accuracy of distance measurement is increased to 2 times that of the conventional one using only one cylindrical lens shown in FIG. 3. Further since the present invention makes use of three kinds of cylindrical lenses $30_1$, $30_2$ and $30_3$ at a time, the provision of the two boundaries $60_1$ and $60_2$ gives rise to two different phases of detection of the in-focus condition. Therefore, when the object lens 1 of the optical instrument is of light F-number, the shifted image at the outer boundary $60_2$ is advantageously utilized in detecting the in-focus condition. When the F-number is dark, as veils appears at areas hatched 7, a shifted image at the inner boundary $60_1$ can be used to achieve precise distance metering.

Figure 9:
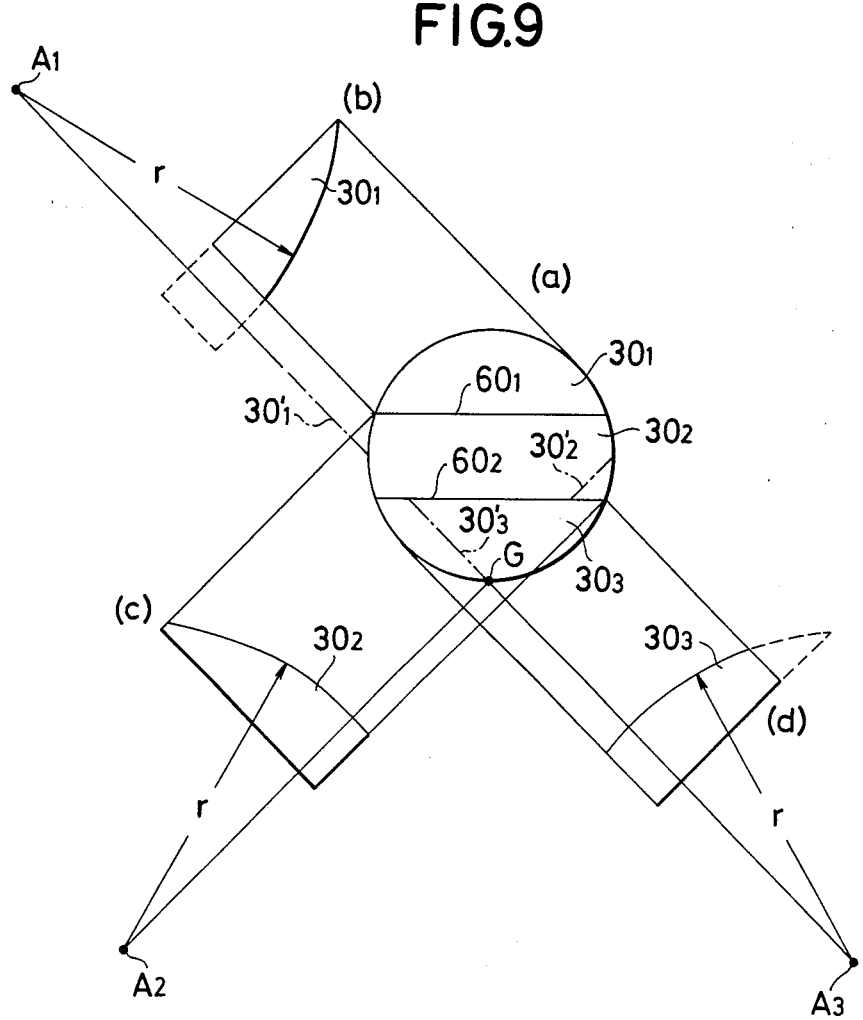
FIG. 9 shows a third embodiment of the present invention with FIG. 9(a) being a plane view and FIGS. 9(b) to 9(d) being sectional views taken in directions of projection of lines in FIG. 9(a).

FIG. 9 shows a third embodiment of the present invention where use is likewise made of three cylindrical lenses $30_1$, $30_2$ and $30_3$ arranged adjacent to each other with their adjoining boundaries $60_1$ and $60_2$ being linear. The direction of mother line of the mid-stage lens $30_2$ is perpendicular to those of mother line of the upper- and lower-stage lenses $30_1$ and $30_3$. Further, the radii of curvature of these three cylindrical lenses $30_1$, $30_2$ and $30_3$ are made equal to each other with their centers $A_1$, $A_2$ and $A_3$ of curvature lying just beneath a point G. FIGS. 9(b) to 9(c) are side elevational views looking from the directions of production of lines of FIG. 9(a) for the cylindrical lenses $30_1$, $30_2$ and $30_3$.

Figure 10:
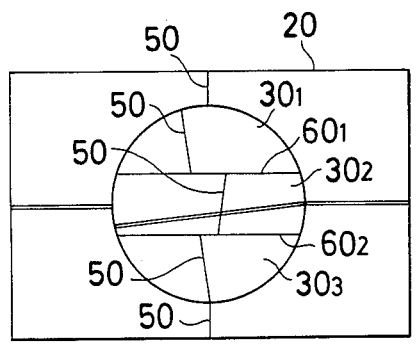
FIG. 10 is a plan view showing how the field of view of the focusing screen using the distance meter of FIG. 9 is seen.
Figure 11:
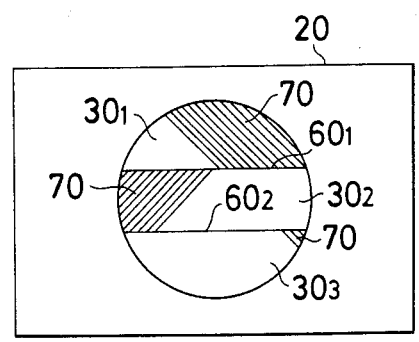
FIG. 11 is a similar view showing formation of black veils in the cylindrical lens of FIGS. 9 and 10.

As proceeding from the cylindrical lens $30$_to those $30_2$ and $30_1$, therefore, the accuracy of distance measurement is increased. FIG. 10 shows how the subject is seen in the field of view of the focusing screen when it is out of focus. The image 50 of a vertical continuous line object is shifted by distances increasing as stages are taken up from the lens $30_3$ to the lens $30_1$, thus appearing not only to be turned in opposite directions to each other, but also causing even the horizontal line of the image 50 to be turned. FIG. 11 shows the veils 70 formed in the assembly of cylindrical lenses when a lens of dark F-number is used as the objective 1. These veils are limited in position so that the part of the boundary $60_2$ which is freed from the veils 70 between the lenses $30_3$ and $30_2$ can be used in quickly and easily performing distance metering with sufficiently high accuracy.

As has been mentioned above, according to this embodiment, in the focusing screen using the cylindrical lens as the distance meter, not only can precise distance metering be performed quickly and easily no matter what F-number the objective lens 1 has, but also any object to be measured for distance may be selected as the target as the horizontal as well as vertical line is focused to a shifted sharp image. Thus, the present invention is very advantageous and suited to improve this type of focusing screen.

What is claimed is:
1. A focusing screen comprising:
   (a) a base plate member; and
   (b) at least two cylindrical lenses formed on said base plate, and arranged adjacent to each other, said adjacent cylindrical lenses being alternatively convex and concave so as to shift between respective areas an image of an object in opposite directions when the object is out of focus.
2. A focusing screen according to claim 1, where said adjacent distance measuring cylindrical lenses confront each other at a circular boundary.
3. A focusing screen according to claim 1, wherein said adjacent distance measuring cylindrical lenses confront each other at a linear boundary.
4. A focusing screen according to claim 1, wherein the direction of mother line of each of said cylindrical lenses is inclined by an angle of 45° with respect to the outer periphery of the focusing screen.
5. A focusing screen comprising:
   (a) a base plate member; and
   (b) at least two cylindrical lenses having the same refractive power respectively formed on said base plate, and arranged adjacent to each other, said adjacent cylindrical lenses differ in the direction of the mother line from each other so as to shift between respective areas an image of an object in opposite directions when the object is out of focus.
6. A focusing screen according to claim 5, in which said two cylindrical lenses are convex cylindrical lenses.
7. A focusing screen according to claim 6, where the mother lines of said convex cylindrical lenses cross each other with an angle of 90°.
8. A focusing screen according to claim 6, in which mother lines of said two convex lenses cross each other.
9. A focusing screen comprising:
   (a) a base plate member; and
   (b) at least one convex cylindrical lens and at least one concave cylindrical lens, said convex cylindrical lens and the concave cylindrical lens being adjacent to each other so as to shift between respective areas an image of an object in opposite directions when the object is out of focus.
10. A focusing screen according to claim 9, wherein said adjacent cylindrical lenses confront each other at a circular boundary.
11. A focusing screen according to claim 9, wherein the direction of mother line of each of said cylindrical lenses is inclined by an angle of 45° with respect to the periphery of the focusing screen.

* * * * *